US009982895B2

(12) United States Patent
Ruther

(10) Patent No.: US 9,982,895 B2
(45) Date of Patent: May 29, 2018

(54) BAKING OVEN DOOR AND BAKING OVEN

(75) Inventor: Florian Ruther, Marktoberdorf (DE)

(73) Assignee: Electronlux Home Products Corporation N.V., Brussels (BE)

( * ) Notice: Subject to any disclaimer, the term of this patent is extended or adjusted under 35 U.S.C. 154(b) by 675 days.

(21) Appl. No.: 13/978,413

(22) PCT Filed: Apr. 19, 2012

(86) PCT No.: PCT/EP2012/057118
§ 371 (c)(1),
(2), (4) Date: Jul. 5, 2013

(87) PCT Pub. No.: WO2012/146523
PCT Pub. Date: Nov. 1, 2012

(65) Prior Publication Data
US 2014/0048055 A1 Feb. 20, 2014

(30) Foreign Application Priority Data

Apr. 29, 2011 (EP) .................... 11003512

(51) Int. Cl.
F24C 15/02 (2006.01)
A21B 3/02 (2006.01)
F24C 7/08 (2006.01)
F24C 15/00 (2006.01)

(52) U.S. Cl.
CPC ............ *F24C 15/02* (2013.01); *A21B 3/02* (2013.01); *F24C 7/08* (2013.01); *F24C 15/006* (2013.01)

(58) Field of Classification Search
CPC .... A21B 1/00; A21B 3/02; A47J 36/12; A47J 37/01; A47J 37/0704; F24C 7/08; F24C 15/02; F24C 15/04; F24C 15/045; F24C 15/06; F24C 15/08

USPC ..................... 126/190–200; 99/341
See application file for complete search history.

(56) References Cited

U.S. PATENT DOCUMENTS 2,281,608 A * 5/1942 Vincent ............... F24C 15/004
126/200
3,453,997 A * 7/1969 Klepzig ..................... 126/198
5,433,189 A * 7/1995 Bales ................... F24C 15/04
126/190
5,441,036 A * 8/1995 Mikalauskas et al. ..... 126/198
5,960,785 A * 10/1999 Byrne ................ F24C 15/004
126/190
6,024,084 A * 2/2000 Gerhardinger ...... C03C 17/3417
126/200

(Continued)

FOREIGN PATENT DOCUMENTS

CN    1523293 A    8/2004
CN    1532458 A    9/2004

(Continued)

OTHER PUBLICATIONS

International Search Report for PCT/EP2012/057118, dated May 22, 2012, 2 pages.

(Continued)

*Primary Examiner* — Gregory Huson
*Assistant Examiner* — Martha Becton
(74) *Attorney, Agent, or Firm* — Pearne & Gordon LLP

(57) ABSTRACT

The invention is directed to a baking oven door 2 and baking oven 1. A camera 10 is mounted inside the door 2 and coupled to a heat sink 8 constituting an outer cover of the door 2.

20 Claims, 2 Drawing Sheets

(56) References Cited

U.S. PATENT DOCUMENTS

| | | | |
|---|---|---|---|
| 6,486,473 B2* | 11/2002 | Salapow | H04N 5/2251 250/330 |
| 6,822,208 B2 | 11/2004 | Henze et al. | |
| 6,891,133 B2 | 5/2005 | Shozo et al. | |
| 6,892,030 B2* | 5/2005 | Rife | G02B 7/028 250/352 |
| 7,329,869 B2* | 2/2008 | Cassel | H04N 5/33 250/339.03 |
| 7,696,454 B2* | 4/2010 | Nam | F24C 3/126 219/393 |
| 7,762,250 B2* | 7/2010 | Elkasevic | F24C 15/006 126/190 |
| 8,753,008 B2* | 6/2014 | Carlson | G01J 5/041 250/338.1 |
| 2004/0253471 A1* | 12/2004 | Thiel et al. | 428/544 |
| 2008/0184984 A1* | 8/2008 | Elkasevic | F24C 15/04 126/198 |
| 2011/0058167 A1* | 3/2011 | Knox | G01N 15/06 356/338 |
| 2011/0255000 A1* | 10/2011 | Weber | G03B 17/02 348/374 |
| 2011/0310564 A1* | 12/2011 | Yamamoto | G03B 17/02 361/707 |
| 2014/0063302 A1* | 3/2014 | Shukla | H04N 5/2254 348/294 |
| 2014/0063334 A1* | 3/2014 | McBride | G03B 17/55 348/373 |
| 2014/0104479 A1* | 4/2014 | Samuels | H04N 5/2254 348/335 |
| 2015/0077537 A1* | 3/2015 | Thursby | E21B 47/0002 348/85 |
| 2015/0330640 A1* | 11/2015 | Stork Genannt Wersborg | F24C 7/08 99/332 |

FOREIGN PATENT DOCUMENTS

| | | |
|---|---|---|
| CN | 101398197 A | 4/2009 |
| CN | 101 435 601 A | 5/2009 |
| DE | 4333443 | 4/1995 |
| DE | 202008000135 | 3/2008 |
| DE | 102008043722 A1 * | 5/2010 |
| EP | 899512 A1 * | 3/1999 |
| EP | 1460342 A1 | 9/2004 |
| FR | 2693538 | 1/1994 |

OTHER PUBLICATIONS

Translation of Office Action in Chinese Patent Application No. 201280006127.3, dated Dec. 3, 2014.

Office Action for Corresponding Application No. EP11003512.8; dated Oct. 27, 2016.

* cited by examiner

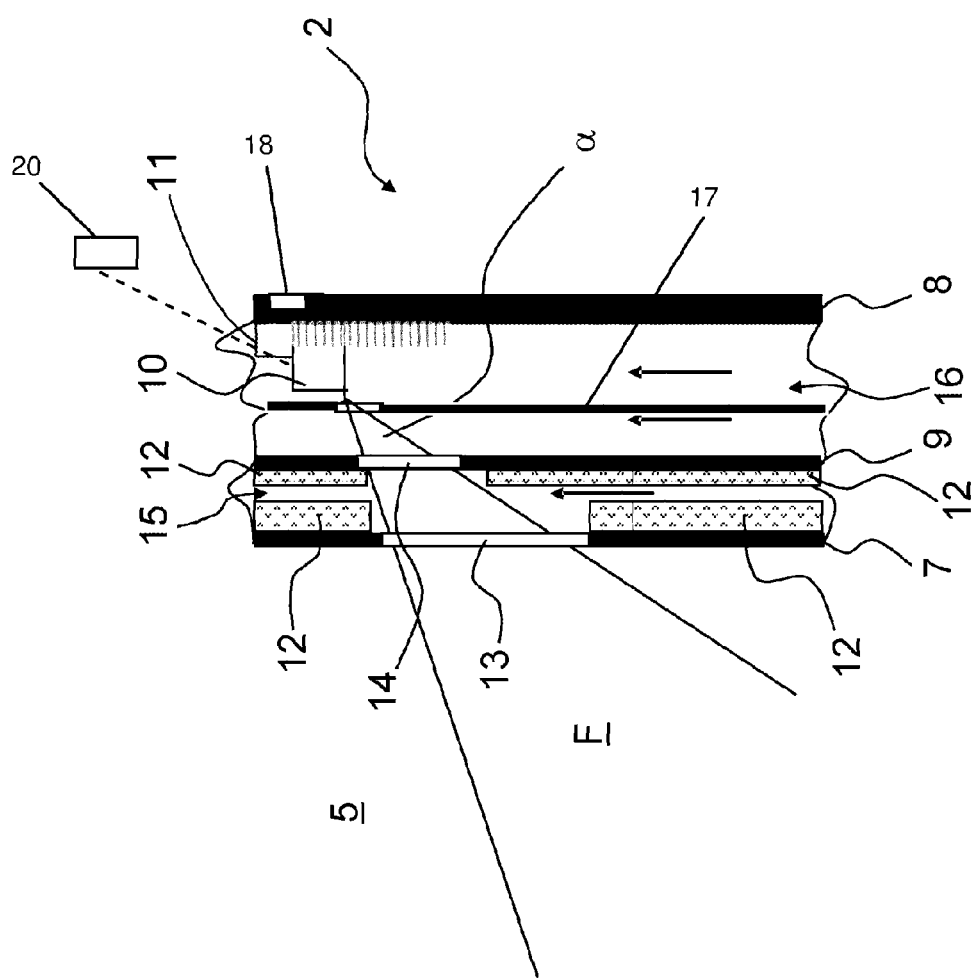

BAKING OVEN DOOR AND BAKING OVEN

The invention is directed to a baking oven door and to a baking oven comprising such a baking oven door.

Today, baking ovens, such as household baking ovens, are known which have insulated, non-transparent doors. Such a design may be advantageous for reducing energy consumption and for reducing the temperatures on the outer, user exposed faces of the door.

As users in general want to observe the baking process within the muffle of the baking oven, optical systems and even camera systems have been proposed in order to visualize the baking chamber, i. e. muffle, at least partially on a display area. Here, reference is made to DE 79 34 764 U1, DE 43 33 443 A1, DE 201 03 517 U1, DE 20 2008 000 135 U1 and DE 10 2008 043 722 A1. However, there is still room for further improving such configurations, in particular with respect to display quality.

Starting therefrom it is an object of the invention to provide a baking oven door and a respective baking oven with an improved visualization system adapted to visualize at least parts of the baking chamber, i. e. muffle, to a user.

This object is solved by the independent claims. Advantageous developments of the invention result from respective dependent claims.

According to independent claim 1, a baking oven door is provided which is adapted to be attached to a household or industrial type baking oven. It goes without saying, that baking oven doors are adapted and designed for closing an opening of a muffle, i. e. baking chamber, of the baking oven, in particular during normal operation. The baking oven door can be hingedly and/or slidably attached to the baking oven.

In the following, the term "door" will be used as a short from for the term "baking oven door".

The door comprises an outer and an inner wall. When mounted to the baking oven and in the closed state of the door, the inner wall faces the muffle of the baking oven, and the outer wall faces away from the muffle, i. e. is exposed to the surroundings and visible by a user.

The door further comprises at least one image recording device, such as a camera. The at least one image recording device is mounted in between, i. e. in an intermediate space between, the outer and inner wall of the door.

The at least one image recording device is arranged and adapted to pick up images of the muffle interior. The field of view of the at least one image recording device may be selected or selectable or adjustable, such that at least images of objects placed in standard positions within the muffle can be recorded. It is of advantage, if the image recording device is positioned and adapted such that baking processes of objects within the muffle, i. e. baking chamber, can be adequately tracked by a user.

In developments, the at least one image recording device, for example having a fixed field of view, can be fixedly attached to the door. In a more elaborate development, actuators coupled to an image recording device and adapted to move and/or rotate a respective image recording device in at least one direction can be provided. Further, it is possible to provide further actuators for adjusting the zoom and/or field of view of the image recording device. By providing actuators and/or further actuators, a user of the baking oven may be allowed to adjust or select the area within the muffle to be recorded by the image recording device. A user interface comprising control elements for controlling the actuators and/or further actuators may be provided as required. In the alternative or in addition, the actuators and/or further actuators may be controlled in an automated manner. In particular, image recording device settings appropriate for a respective user selected baking program can be set automatically in order to provide images of baking program relevant areas of the muffle.

With the proposed baking oven door, at least a part of the outer side of the outer wall comprises, or even constitutes, a heat sink which is thermally coupled to, i. e. in direct thermal contact with, the image recording device. The outer side of the outer wall shall mean the side facing away from the muffle in the closed state, i. e. the side of the door directly exposed to the environment.

The heat sink preferably has high thermal conductivity. The heat sink may be an integrated part of the outer wall, and in particular may constitute the outer wall. It is also possible that the heat sink is attached to the outer wall, preferably making up or being part of an outside cover of the door.

With the proposed configuration, the image recording device can be cooled efficiently via the heat sink. Efficient cooling is, inter alia, advantageous for adequate image quality, and favorable for image recording device lifetimes.

In a further development, the heat sink is a flat, sheet-like thermal conductor, preferably at least partially constituting an outer cover of the door. Comparatively high cooling efficiency can be obtained if the heat sink covers the whole outer side of the door, i. e. the whole outer side of the outer wall. A further advantage of such a design is that heat loss through the door can be reduced, and, as a yet further advantage, the outer surface of the door can be cleaned comparatively easy.

In a further development, the outer wall and/or outer cover, in particular the thermal conductor, are/is opaque to a user of the baking oven appliance. In this case, incidence of light from the outside into the muffle can be prevented, which in turn may contribute to improved image quality. As opaque, i. e. non-transparent, materials generally also block heat or heat radiation, the temperature at the outer side can be kept low and heat loss through the door can be reduced, i. e. energy efficiency of the baking oven can be improved.

In a yet further development, the thermal conductor is made from metal, metal alloys, ceramic and/or plastic. Also composites of the aforementioned materials may be used. The thermal conductor can also or in addition comprise metal, metal alloy, ceramic and/or plastic particles or fibres embedded in a matrix. In particular, these type of materials show good, or even high heat conductivity and heat emissivity, which is advantageous for effectively cooling the image recording device.

In another development, the inner wall of the door comprises an image recording window, wherein the inner wall is preferably made from glass at least in the region of the image recording window. In particular, the whole inner wall can be made from glass, i. e. the inner wall can comprise a pane of glass. However, it is also possible that only the image recording window or the region of the image recording window is made from glass, whereas the remainder of the inner wall is made from a material other than glass, such for example a material with low thermal conductivity and/or high thermal reflectivity. The image recording window shall be sized and positioned such that the resulting image recording field of view of the image recording device is sufficiently large, to allow imaging of at least the relevant regions of the muffle, such as for example the muffle center. The relevant region may comprise the section of the muffle interior in which items to be baked are positioned in at least most instances. In particular, it is desirable that the image recording field of view is such or can be adapted such that images of items, such as foodstuff and the like, can be recorded for all conventional and usual operating conditions. Imaging of the whole muffle interior may require more than one image recording device and/or may require adaptation of the image recording field of view.

In a preferred development, the door further comprises at least one partition wall arranged between the outer and inner wall. Preferably, the image recording device is mounted in between, i. e. in a space between, the partition wall and the outer wall and/or in a space between adjacent partition walls. Using a partition wall can greatly reduce heat load of the image recording device.

The partition wall or partition walls arranged between the image recording device and the inner wall comprises or comprise, respectively, a further image recording window. The further image recording window is preferably sized, positioned and aligned with the image recording window to obtain an optimal field of view. In other words, the further image recording window shall be designed, positioned and sized such that the field of view allowed by the image recording window is not restricted in size by the further image recording window.

As the image recording window and the at least one further image recording window are arranged in series, the further image recording window may have smaller dimensions than the image recording window of the inner wall. Also, in adequately sizing and positioning and aligning the image recording window and the further image recording window or windows, heat loss through the door can be kept at a minimum.

The at least one partition wall is preferably made from glass at least in the region of the further image recording window. Here, reference is also made to respective configuration of the inner wall and respective image recording window. In more detail, outside the further image recording window, the partition wall may be made from a material different from glass, preferably a material with low thermal conductivity and preferably high thermal reflectivity. At least in the region of the further image recording window shall in particular include the case that the partition wall as a whole is made from glass.

In another development, the door comprises at least one channel, preferably running in vertical direction in normal use of the baking oven door. The channel is designed for guiding through a cooling medium, preferably a gaseous cooling medium. With such a channel, which constitutes a kind of cooling channel, the door as such and/or even the image recording device can be directly cooled.

In embodiments, the channel can be designed as a passive and/or active cooling channel. The term passive cooling channel shall mean that a stream of cooling medium through the channel is established by thermal processes, in particular thermal convection. In this case, vertical channels may be most efficient. The term active cooling channel shall mean that the cooling medium is forced through the channel, for example by a fan, ventilator or blower, which, subject to the design and size of the channel, allow higher flow rates and therefore higher cooling efficiency.

In a preferred development, at least one channel is arranged at least one of between the inner wall and an adjacent partition wall, between two adjacent partition walls, and the outer wall and an adjacent partition wall. In all cases, the average temperature prevailing in the inner spaces of the door can be reduced, which in turn reduces the temperature load of the image recording device. Further, the temperature at the outer side of the outer wall, i. e. the heat sink, can be reduced. Low temperatures at the outer side are desirable for preventing burns when touching the outer side of the door.

Preferably, at least one channel is provided in an intermediate space between the inner wall and an adjacent partition wall, two adjacent partition walls, and the outer wall and an adjacent outer wall, in which intermediate space the image recording device is positioned. Here, direct cooling of the image recording device is possible.

A comparatively low temperature load of the image recording device can be obtained if it is arranged in the outermost space next to the outer wall.

In a further preferred embodiment, the image recording device is coupled to a cooling element which is arranged within the door, and which is thermally coupled, preferably in direct thermal contact, to the heat sink. By using such a cooling element, heat can be efficiently removed from the image recording device and transferred to the heat sink. The cooling element may be made from metal, in particular light metal, such as aluminum, or a metal alloy.

In a development, at least one channel for guiding through a cooling medium is arranged and designed such that a cooling medium guided or passing through the channel directly impinges the image recording device and/or the cooling element. In this case, the image recording device can be cooled efficiently.

In a yet further preferred embodiment, an insulation material is provided at least one of in a space between the inner wall and the outer wall, in a space between the inner wall and an adjacent partition wall, in a space between adjacent partition walls, and in a space between the outer wall and an adjacent partition wall.

In order not to impair the field of view of the image recording device, the insulation material has recesses adapted to the size of the image recording window and/or further image recording window.

By using an insulation material, which may be of silicon carbide type or any other suitable type, in particular a porous or granular type material, the image recording device can be shielded from high temperature loads, and the temperature at the outer side of the door can be kept low. Further, the energy loss through the door can be greatly reduced, which is desirable for high energy efficiency type baking ovens.

At least one channel may pass through, i. e. may be integrated in, the insulation material. The channel is preferably located on a side of the insulation material facing towards the outer wall. In this way, advantageous insulation properties, in particular towards the image recording device, as well as good cooling and energy efficiency can be obtained.

In a further development, at least the inner wall, and preferably at least one of the at least one partition wall arranged between the image recording device and the inner wall, are coated with an infra-red reflecting material. The infra-red reflecting material is applied on a side facing the muffle in normal use of the door, at least in the region of the image recording window and/or further image recording window. Using such a coating at least in the region of the image recording window and/or further image recording window can lower the temperature load of the image recording device and may reduce heat loss through the door.

In a further development, at least one of the inner wall, outer wall, and at least one partition wall, is coated with a non-reflecting optic material. The non-reflecting optic material is applied on a side facing towards the outer side of the door, at least in the region of the image recording window and/or further image recording window. Such a nonreflective coating, which may be a black matte paint, may prevent reflections or other optical effects negatively affecting image quality.

According to independent claim 15, a baking oven is provided, in particular a baking oven of household or industrial appliance, which comprises at least one muffle and at least one corresponding door as described above, in particular according to any of the described embodiments and developments.

The at least one door is mounted to the baking oven and adapted for closing the at least one muffle during normal operation of the baking oven. The at least one door can for example be hingedly and/or slidably mounted or attached to the baking oven, in particular a frame of the baking oven. As to advantages and advantageous effects of the baking oven, reference is made to the description above.

In a development of the baking oven, the baking oven may comprise at least one display device adapted to display and/or project images recorded by the image recording device on a display area.

At least one of the at least one display devices can be mounted at and/or integrated in a front cover of the baking oven, in particular the front wall.

It is also possible, that images recorded by the image recording device are transmitted, for example by wireless communication, to a mobile display device. Such a mobile display device may be specifically designed for the respective baking oven. However, any suitable mobile display device can be used, in particular portable type screens, displays or screens of mobile phones or mobile computers and the like. Using mobile displays as set out beforehand has the advantage that a user can check the status of items placed within the muffle from nearly any remote location. The baking oven may comprise special fixtures and interfaces for removably fixing and connecting mobile display devices to the baking oven.

In a preferred development of the baking oven, the image recording device is mounted in an upper part of the door. With such a mounting position favorable fields of view for imaging relevant areas of the muffle of the baking oven can be obtained.

Exemplary embodiments of the invention will now be described in connection with the annexed figures, in which:

FIG. 2 shows a vertical sectional view of a baking oven door.

In the figures, like elements are designated by like reference signs.

Figure 1:
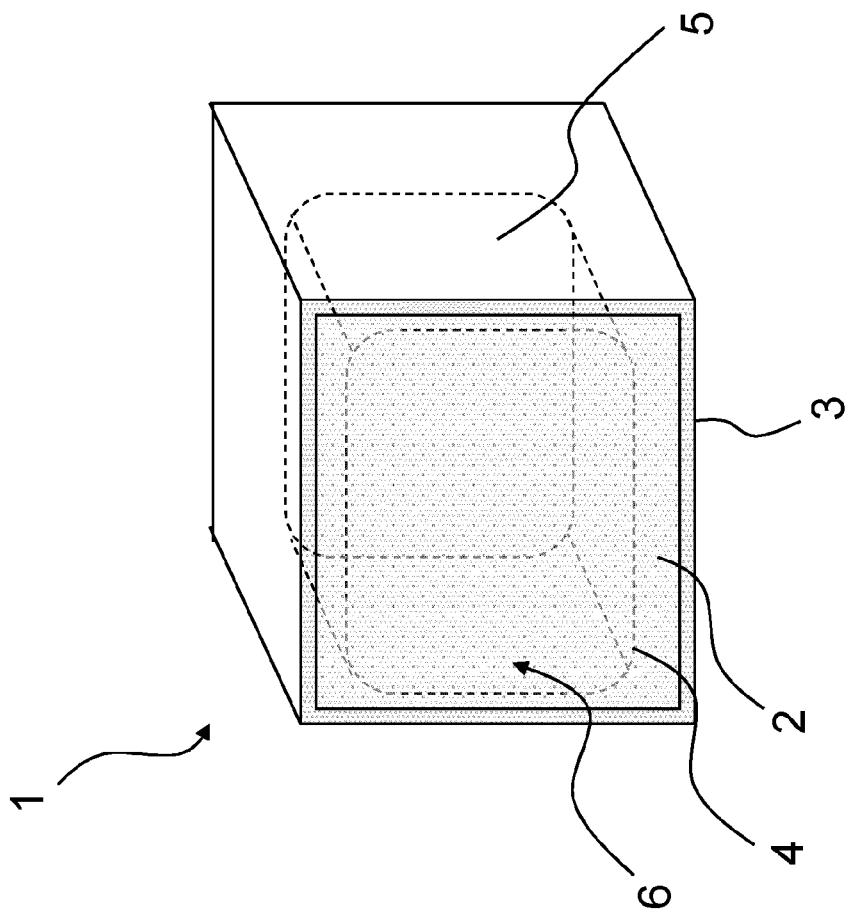
FIG. 1 shows a schematic perspective view of a baking oven.

FIG. 1 shows a schematic perspective view of a baking oven 1 comprising a door 2. The door 2 is hingedly attached to a frame 3 of the baking oven 1 and is designed and adapted to close at least an opening 4 of a baking camber, i. e. a muffle 5, of the baking oven 1.

In the present case, the door 2 is sized such that in the closed state, it covers or extends over nearly the whole front face 6 of the baking oven 1. Such configurations are often requested or preferred by customers and users, mainly for design and esthetic reasons. However, a door configured to cover the whole front face may be effective in reducing heat loss through the door 2.

FIG. 2 shows a vertical sectional view of the door 2. The door 2 has a layer structure and comprises an inner wall 7, an outer wall 8 and a partition wall 9 arranged between the inner wall 7 and the outer wall 8. Note that the partition wall 9 is only optional, i. e. the present invention can also be implemented without any partition wall 9.

The door 2 further comprises a camera 10, which in more general terms constitutes an image recording device. The camera 10 is mounted between the partition wall 9 and the outer wall 8. As can be seen from FIG. 2, the camera 10 is mounted to the outer wall 8.

In accordance with the present invention, the outer wall 8 constitutes a heat sink to which the camera 10 and/or an optional cooling element 11 is/are thermally coupled. If a cooling element 11 is used, the camera 10 may be thermally coupled to the cooling element which in turn is thermally coupled to the heat sink.

The heat sink in the present case constitutes a front cover of the door. The front cover is exposed to environmental temperatures of the baking oven 1, which in general are far below the temperatures prevailing within the muffle 2 and within the door 2 during operation of the baking oven 1. Due to the comparatively low temperatures of the heat sink, i. e. front cover, the camera 10 can be efficiently cooled without any further cooling devices.

The heat sink is formed as a flat sheet-like thermal conductor, which may be made from metal, metal alloys, ceramics, plastics or mixtures thereof. Any other material with good heat conducting and heat emission properties can be used as well. In the present case the heat sink is made from aluminum which has comparatively good heat conducting properties. In the present case, the heat sink, thermal conductor, outer cover and outer wall are all the same.

As the aluminum heat sink has comparatively good heat conducting and emission properties, heat can be efficiently removed from the camera 10 and released to the surrounding environment, i. e. the camera 10 can be efficiently protected against overtemperatures. Due to the advantageous thermal properties of the aluminum heat sink, temperatures prevailing at the outer side of the door 2 can be kept low reducing the danger of burns.

As the outer wall, i. e. the outer cover, in the present case is made from aluminum, the outer wall is not transparent to a user of the baking oven 1. As a consequence, items placed within the muffle 5 can not be directly observed by the user's eye. However, the camera 10 is arranged and adapted to pick up images of the interior of the muffle 5, such that images of an item, such as foodstuff, arranged within the muffle 5 can be presented to the user.

Sections of the door 2 towards the muffle interior have to be sufficiently transparent and adequately sized so that the camera 10 can pick up images of relevant sections of the muffle interior. Here, the inner wall 7 and the partition wall 9 can be provided with image recording windows sized and positioned to obtain a satisfactory field of view F at least with respect to relevant areas or sections within the muffle 5. In the configuration of FIG. 2, the inner wall is made from glass which is transparent anyway.

In the space between the partition wall 9 and the inner wall 7 there is arranged an insulation material 12. The insulation material is applied for reducing heat transfer and heat loss through the door 2.

In order to obtain suitable field of view angles □, the insulation material 12 has a cut-out sufficiently large so as not to impair the field of view F of the camera 10. Via the cut-out in the insulation material 12 a first image recording window 13 of the inner wall 7 is defined.

Further, a second image recording window 14 is provided in the partition wall 9. The size, location and orientation of the second image recording window 14 is adapted and adjusted to the first image recording window 13 so that an optimal field of view F is obtained. The partition wall 9 may be made from glass or other materials, wherein at least the section of the partition wall 9 containing or constituting the second image recording window 14 is made from glass.

The insulation material 12 is cut out according to the image recording windows. Respective recesses in the insulation material 12 are such that an optimal field of view F can be realized.

An additional measure to reduce the temperatures within the door 2, i. e. to reduce the thermal load of the camera 10, is to provide cooling channels within the door 2. The cooling channels are adapted to guide through a cooling medium.

In the configuration shown in FIG. 2, a first cooling channel 15 is provided within the insulation material 12, such that a flow of cooling medium can be directed to the first 13 and second image recording window 14. In FIG. 2, a flow of cooling medium is indicated by vertical arrows.

The first cooling channel 15 is provided as a type of cut-out channel in the insulation material 12. The first cooling channel 15 is in particular designed to cool, i. e. to lower the temperature in the space between the first 13 and second image recording window 14. In this way, heat radiation impinging on the camera 10 can be reduced, which in turn reduces the thermal load of the camera 10 and improves image quality.

As an additional way to cool the camera 10, the space between the outer wall 8 and the partition wall 9 can be used as a second cooling channel 16. By guiding through a cooling medium, such as a gaseous cooling medium, in particular air, through the second cooling channel 16, the camera 10 and/or the cooling element 11 can be directly cooled, i. e. directly impinged with cooling medium.

So far, the camera 10 is shielded from high temperatures prevailing in the muffle 5 by the inner wall 7 and the partition wall 9. Insulation material 12 and circulation of a cooling medium further contribute to reduce temperature load of the camera 10. The insulation material 12 also reduces heat loss through the door, which is a relevant aspect for low energy baking ovens.

An additional possibility for reducing thermal load of the camera 10 and heat loss through the door 2 is to provide at least the inner wall 7, and/or the partition wall 9 with an infra-red reflecting coating. In this way, heat radiation through the door 2, i. e. heat loss through the door and thermal load of the camera 10, can be further reduced. Preferably, the infra-red reflecting coating is applied to the side of the inner wall 7 and/or partition wall 9 facing the muffle 5.

On a side of the inner wall 7 and the partition wall 9 oriented away from the muffle 5, i. e. facing the camera 10, there may be applied a mat paint. Such a mat paint may be useful in reducing reflections and other optical interferences and disturbances impairing image quality of the camera 10.

The cooling medium, in particular air, can be actively guided through the first and second cooling channel 15 and 16. However, it is also possible to design the first and/or the second cooling channel such that a flow of cooling medium can be established and maintained by thermal processes.

Images recorded by the camera 10 can be presented to a user of the baking oven 1 on a display attached, preferably removably attached, to the baking oven 1. Such a display may be a conventional display device, including optical displays and projection displays and the like fixedly installed at the oven 1. Further, images recorded by the camera 10 can be displayed on mobile imaging devices. Such a mobile imaging device may be any suitable mobile display device able to communicate with the baking oven 1, i. e. to receive and display images recorded by the camera 10. In particular, display devices of mobile phones and mobile computers can be used to display images recorded by the camera 10. In the latter cases, information of the camera 10, in particular images of the interior of the muffle 5 can be viewed from remote locations.

As can be seen, the proposed door is effective in reducing temperature load to a camera mounted within the door. In particular, the camera can be efficiently protected from thermal impacts, leading to improved image quality, display quality and lifetime of respective imaging devices.

REFERENCE SIGNS 1 baking oven
2 door
3 frame
4 opening
5 muffle
6 front face
7 inner wall
8 outer wall
9 partition wall
10 camera
11 cooling element
12 insulation material
13 first image recording window
14 second image recording window
15 first cooling channel
16 second cooling channel
F field of view
☐ field of view angle

The invention claimed is:

1. Baking oven door (2) adapted to be attached to a household or industrial type baking oven (1) and being adapted to close an opening (4) to a muffle (5) of the baking oven (1), the baking oven door (2) comprising an outer (8) and an inner wall (7) and at least one image recording device (10), wherein the at least one image recording device (10) is mounted inside the door (2) in between the outer (8) and inner wall (7) and is arranged and adapted to pick up images of the muffle (5) interior, and wherein at least a part of an outer side of the outer wall (8) comprises a heat sink which is thermally coupled to the image recording device (10).

2. Baking oven door (2) according to claim 1, wherein the heat sink is a flat, sheet-like thermal conductor (8), wherein the heat sink at least partially constitutes an outer cover of the baking oven door (2).

3. Baking oven door (2) according to claim 1, wherein the outer wall (8) and/or outer cover comprises a thermal conductor, are/is opaque to a user of the baking oven (1).

4. Baking oven door (2) according to claim 2, wherein the thermal conductor (8) is made from metal, a metal alloy, ceramic and/or plastic, and/or the thermal conductor (8) comprises metal, metal alloy, ceramic and/or plastic particles and/or fibres embedded in a matrix.

5. Baking oven door (2) according to claim 1, wherein the inner wall (7) of the door (2) comprises an image recording window (13), wherein the inner wall (7) is made from glass at least in the region of the image recording window (13).

6. Baking oven door (2) according to claim 1, further comprising at least one partition wall (9) arranged between the outer (8) and inner wall (7), wherein the image recording device (10) is mounted in between the partition wall (9) and the outer wall (8), and the partition wall/walls (9), (17) between the image recording device (10) and the inner wall (7) comprises/comprise a further image recording window (14), wherein the at least one partition wall (9) is made from glass at least in the region of the further image recording window (14).

7. Baking oven door (2) according to claim 1, comprising at least one channel (15, 16) running in vertical direction in normal use of the baking oven door (2), the channel (15, 16) being designed for guiding through a cooling medium, wherein the cooling medium comprises a gaseous cooling medium.

8. Baking oven door (2) according to claim 7, wherein at least one channel (15, 16) is arranged at least one of between the inner wall (7) and an adjacent partition wall (9), between two adjacent partition walls (9), and the outer wall (8) and an adjacent partition wall (9).

9. Baking oven door (2) according to claim 1, wherein the image recording device (10) is coupled to a cooling element (11) which is arranged within the baking oven door (2) and which is in direct thermal contact with the heat sink (8).

10. Baking oven door (2) according to claim 7, wherein the at least one channel (16) is arranged and designed such that the cooling medium passing through the channel (16) impinges the image recording device (10) and/or the cooling element (11).

11. Baking oven door (2) according to claim 1, wherein an insulation material (12) is provided at least one of in a space between the inner wall (7) and the outer wall (8), in a space between the inner wall (7) and an adjacent partition wall (9), in a space between adjacent partition walls (9) and in a space between the outer wall (8) and an adjacent partition wall (9), wherein the insulation material (12) has recesses adapted to the size of a first image recording window (13) and/or a second image recording window (14).

12. Baking oven door (2) according to claim 7, wherein at least one channel (15) passes through an insulation material (12), wherein the one channel (15) is positioned on a side of the insulation material (12) facing towards the outer wall (8).

13. Baking oven door (2) according to claim 1, wherein at least the inner wall (7), and preferably an at least one partition wall (9) arranged between the image recording device (10) and the inner wall (7), are coated with an infra-red reflecting material on a side facing the muffle (5) in normal use of the baking oven door (2), at least in the region of a first image recording window (13) and/or a second image recording window (14).

14. Baking oven door (2) according to claim 1, wherein at least one of the inner wall (7), outer wall (8) and at least one partition wall (9), is coated with a non-reflecting optic material on a side facing towards the outer side of the baking oven door (2), at least in the region of a first image recording window (13) and/or a second image recording window (14).

15. Household baking oven (1) comprising at least one muffle (5) and at least one baking oven door (2) according to claim 1, the at least one baking oven door (2) being mounted to the baking oven (1) and adapted for closing the at least one muffle (5) during normal operation of the baking oven (1).

16. Household baking oven (1) according to claim 15, further comprising at least one display device (18) adapted to display and/or project images recorded by the image recording device (10) on a display area, wherein the at least one display devices (18) is mounted and integrated, in a front cover of the baking oven, in particular in a front wall (8).

17. Household baking oven (1) according to claim 15, wherein the image recording device (10) is mounted in an upper part of the baking oven door (2).

18. Household baking oven (1) according to claim 16, wherein the at least one display devices comprises a mobile type display device (20).

19. Baking oven door (2) according to claim 1, wherein the image recording device (10) is in at least one channel (15, 16) formed between the outer (8) and inner wall (7), and a cooling medium is provided in the at least one channel (15, 16) such that the image recording device (10) is in direct fluid contact with the cooling medium in the at least one channel (15, 16).

20. Baking oven door (2) according to claim 1, wherein the image recording device (10) is positioned at an inner surface of the outer wall (8), the inner surface facing the inner wall (7).

* * * * *